United States Patent
Pellom et al.

(10) Patent No.: US 10,223,512 B2
(45) Date of Patent: Mar. 5, 2019

(54) VOICE-BASED LIVENESS VERIFICATION

(71) Applicant: Sensory, Incorporated, Santa Clara, CA (US)

(72) Inventors: Bryan Pellom, Erie, CO (US); Gordon Haupt, Saratoga Springs, NY (US); Karl Ridgeway, Boulder, CO (US)

(73) Assignee: Sensory, Incorporated, Santa Clara, CA (US)

( * ) Notice: Subject to any disclaimer, the term of this patent is extended or adjusted under 35 U.S.C. 154(b) by 107 days.

(21) Appl. No.: 15/247,292

(22) Filed: Aug. 25, 2016

(65) Prior Publication Data

US 2018/0060552 A1 Mar. 1, 2018

(51) Int. Cl.
*G06F 21/32* (2013.01)
*G06F 17/30* (2006.01)

(52) U.S. Cl.
CPC ........ *G06F 21/32* (2013.01); *G06F 17/30743* (2013.01)

(58) Field of Classification Search
CPC .......................... G06F 21/32; G06F 17/30743
See application file for complete search history.

(56) References Cited

U.S. PATENT DOCUMENTS

| | | | |
|---|---|---|---|
| 5,339,385 A * | 8/1994 | Higgins | G07C 9/00158 704/246 |
| 6,691,089 B1 * | 2/2004 | Su | G06F 21/32 704/244 |
| 9,318,114 B2 * | 4/2016 | Zeljkovic | G10L 17/24 |
| 2007/0233483 A1 * | 10/2007 | Kuppuswamy | G10L 17/20 704/247 |
| 2010/0106502 A1 * | 4/2010 | Farrell | G07C 9/00158 704/246 |
| 2011/0276323 A1 * | 11/2011 | Seyfetdinov | G06F 21/32 704/207 |
| 2012/0253810 A1 * | 10/2012 | Sutton | G06F 21/32 704/246 |
| 2015/0301796 A1 * | 10/2015 | Visser | G06F 3/167 715/728 |

OTHER PUBLICATIONS

Nuance "Nuance VocalPassword:: Liveness Detection using Voice Biometrics Overview," pp. 1-2, http://www.nuance.es/ucmprod/groups/enterprise/@web-enus/documents/collateral/nc_015226.pdf (Year: 2011).*

* cited by examiner

*Primary Examiner* — Theodore C Parsons
*Assistant Examiner* — Carlos M De Jesus Lassala
(74) *Attorney, Agent, or Firm* — Fountainhead Law Group P.C.

(57) ABSTRACT

Techniques for implementing voice-based liveness verification are provided. In one embodiment, a computing device can present a series of challenge prompts to a user being authenticated, where each challenge prompt corresponds to a request to utter a liveness passphrase that is randomly selected from a set of liveness passphrases that have been previously enrolled by an enrolled user of the computing device. The computing device can then receive utterances from the user in response to the series of challenge prompts and, if each utterance matches its corresponding enrolled liveness passphrase, can conclude that the user is a live subject.

18 Claims, 5 Drawing Sheets

VOICE-BASED LIVENESS VERIFICATION

BACKGROUND

Voice-based authentication systems capture an audio sample of a user's voice at the point of authentication (e.g., at a time the user attempts to access a secured resource such as a device or application) and analyze the audio sample against one or more enrolled voice samples/templates to verify the identity of the user. According to one common implementation, the user is first asked to enroll his/her voice by uttering a user-defined passphrase. This utterance, or a representation thereof, is stored as an enrolled voice sample for the user. The user is then asked to utter the same passphrase at the point of authentication, thereby enabling the uttered sample to be compared with the enrolled sample for verification purposes.

One challenge with implementing a voice-based authentication system is ensuring that the system is resistant to replay attacks. In a replay attack, an imposter presents a pre-recorded audio sample of an enrolled user saying his/her passphrase to the voice authenticator, with the hopes that the authenticator will mistake the recording for a live utterance of the passphrase by the user. If the authenticator is not able to detect/verify the "liveness" of the presented sample, the authentication module may be fooled by the recording and allow entry/access to the imposter.

SUMMARY

Techniques for implementing voice-based liveness verification are provided. In one embodiment, a computing device can present a series of challenge prompts to a user being authenticated, where each challenge prompt corresponds to a request to utter a liveness passphrase that is randomly selected from a set of liveness passphrases that have been previously enrolled by an enrolled user of the computing device. The computing device can then receive utterances from the user in response to the series of challenge prompts and, if each utterance matches its corresponding enrolled liveness passphrase, can conclude that the user is a live subject.

A further understanding of the nature and advantages of the embodiments disclosed herein can be realized by reference to the remaining portions of the specification and the attached drawings.

DETAILED DESCRIPTION

Figure 1:
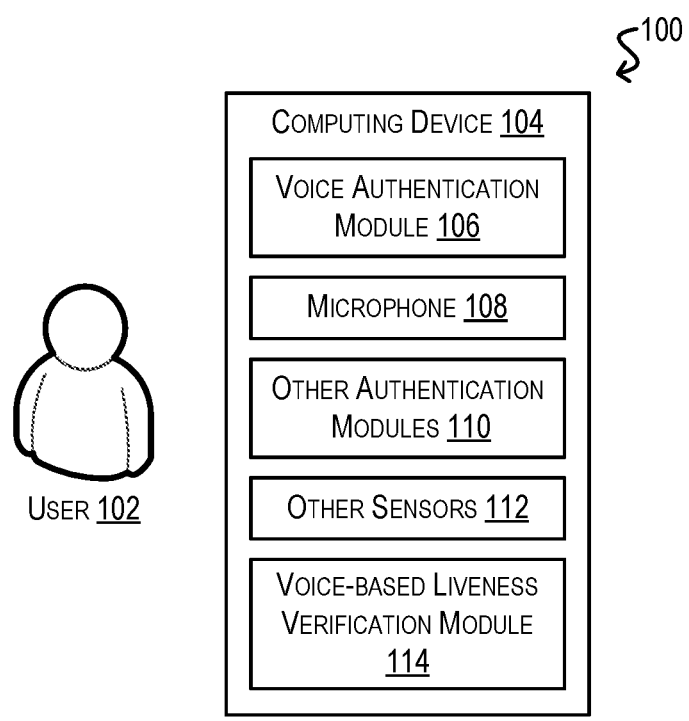
FIG. 1 depicts a system environment according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques for verifying the liveness of a user that is attempting to authenticate himself/herself using voice biometrics (potentially combined with other biometrics). These techniques are collectively referred to herein as "voice-based liveness verification."

At a high level, voice-based liveness verification involves presenting, at a point of authentication, a series of challenge prompts to the user being authenticated. In various embodiments, the challenge prompts comprise requests to utter one or more "liveness passphrases" that are selected randomly from a larger set of liveness passphrases that have been captured from an enrolled user. For example, in one embodiment, the set of enrolled liveness passphrases can correspond to a set of X two-digit numbers, and the user can be prompted to utter Y of the X two-digit numbers during authentication, where the Y two-digit numbers are selected randomly and where Y is less than X. If the user's utterances match the enrolled samples of the selected liveness passphrases, the authentication system can conclude that the user is a live subject and thus can proceed to authenticate the user based on the credentials/biometric data provided during the authentication process (e.g., user-defined voice passphrase, fingerprint scan, face capture, etc.). However, if the user's utterances do not match the enrolled samples, the authentication system can conclude that the user is not a live subject and thus can deny access to the secured resource.

With the voice-based liveness verification approach described above, the vulnerability of the authentication system to replay attacks can be significantly reduced, since it is unlikely that an imposter will have (1) a recording of an enrolled user's personal security metadata (e.g., user-defined voice passphrase), (2) recordings of the user uttering every liveness passphrase in the set of enrolled liveness passphrases (or the particular subset of liveness passphrases selected at the time of authentication), and (3) the ability to quickly choose the correct liveness passphrase recording for playback in response to each challenge prompt. Varying levels of difficulty and security can be achieved by, e.g., increasing the number of liveness passphrases that need to be uttered at the time of authentication, increasing the number of liveness passphrases that are enrolled per user, and/or increasing the domain space of the liveness passphrase set (e.g., three-digit numbers instead of two-digit numbers).

Further, in certain embodiments, the foregoing techniques can be enhanced in a manner that allows the set of enrolled liveness passphrases to be continuously augmented over time. These and other aspects of the present disclosure are described in further detail in the sections that follow.

2. System Environment

FIG. 1 depicts a system environment 100 that supports voice-based liveness verification according to an embodiment. As shown, system environment 100 includes a user 102 and a computing device 104. Computing device 104 can be any type of electronic device that is capable of (either alone or in conjunction with other devices/systems) authenticating user 102 based on his/her voice. In one embodiment, computing device 104 can be a mobile device, such as a smartphone, a tablet, a smartwatch, or the like. In other embodiments, computing device 104 can be a larger device or system, such as a desktop computer, a kiosk or ATM machine, an in-vehicle computer system, etc.

To carry out its voice-based authentication processing, computing device 104 includes a voice authentication module 106 and a microphone 108. In some embodiments, computing device 104 may also be capable of authenticating user 102 using other biometrics (either separate from, or in combination, with voice biometrics). Examples of such other biometrics include face, fingerprint, retinal pattern, and so on. To that end, computing device 104 can also include one or more other biometric authentication modules 110, as well as corresponding sensors 112 for enabling authentication via modules 110 (e.g., camera, fingerprint sensor, retinal scanner, etc.).

As noted in the Background section, one drawback with existing voice-based authentication systems is that they are vulnerable to replay attacks. In such an attack, an imposter presents a recording of an enrolled user uttering his/her personal voice passphrase, thereby fooling the system into believing that the enrolled user is present at the point of authentication.

To address this and other similar issues, computing device 104 of FIG. 1 includes a voice-based liveness verification module 114. Module 114 can be implemented as software that is executed by, e.g., a general-purpose processor of computing device 104, as a dedicated hardware component, or as a combination of software and hardware. As described in further detail below, liveness verification module 114 can (concurrently with, or after, authentication of a user's identity via authentication modules 106 and/or 110) present to the user a series of challenge prompts that ask the user to utter one or more liveness passphrases. These liveness passphrases are randomly selected from a larger set of liveness passphrases that have been previously captured from a valid (i.e., enrolled) user. If all of the utterances match the enrolled samples of the selected liveness passphrases, module 114 can determine that the user attempting authentication is a live subject. On the other hand, if any utterance does not match its corresponding enrolled sample, module 114 can determine that the user is likely some form of replay media (e.g., a recording) that is being presented by an imposter to spoof an enrolled user. With this approach, liveness determination module 114 can enable computing device 104 to more accurately and quickly authenticate users in the face of potential replay attacks.

It should be appreciated that system environment 100 of FIG. 1 is illustrative and not intended to limit embodiments of the present disclosure. For example, although modules 106, 110, and 114 are shown as executing on computing device 104, in alternative embodiments some portion of the functions attributed to these modules may be performed remotely on another device/system, such as a cloud-based server. Further, the various entities shown in FIG. 1 may have other subcomponents or functions that are not explicitly described. One of ordinary skill in the art will recognize many variations, modifications, and alternatives.

3. Workflows

Figure 2:
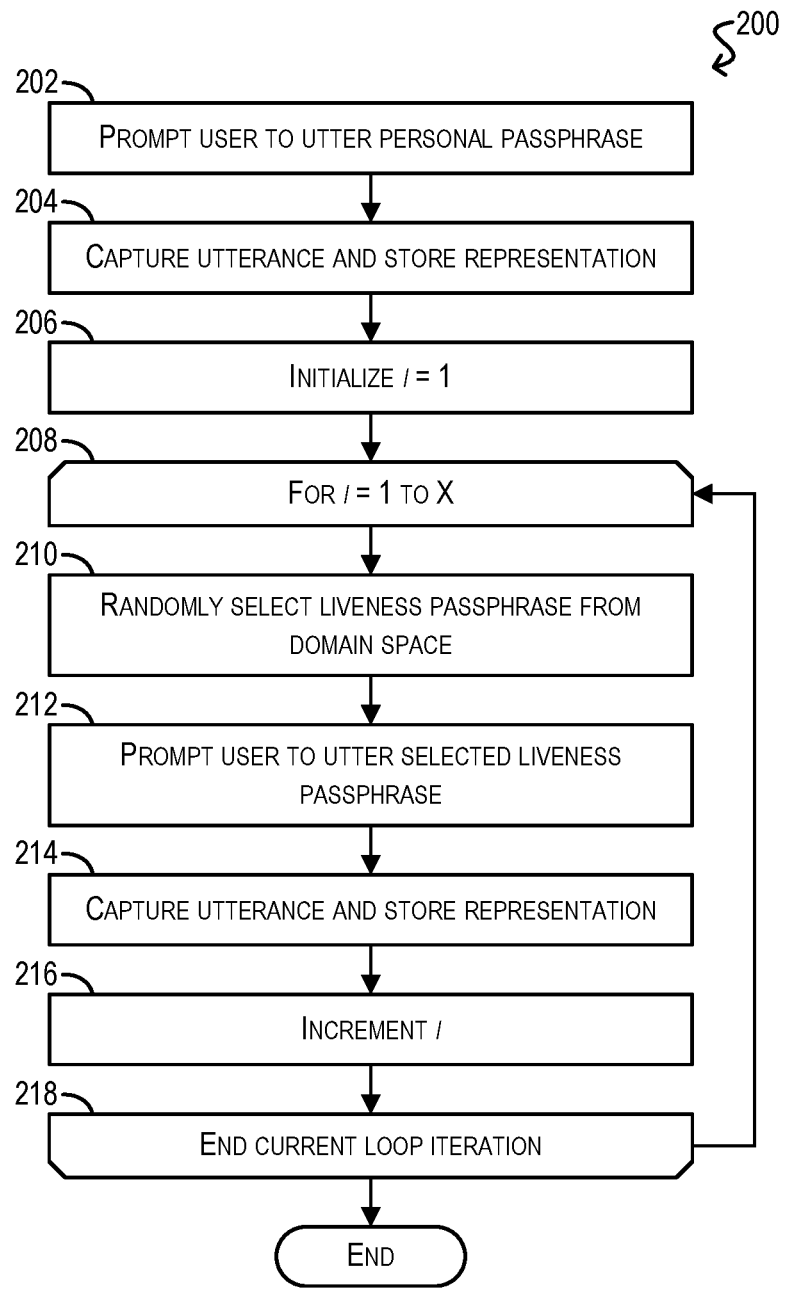
FIG. 2 depicts a user enrollment workflow for implementing voice-based liveness verification according to an embodiment.
Figure 3:
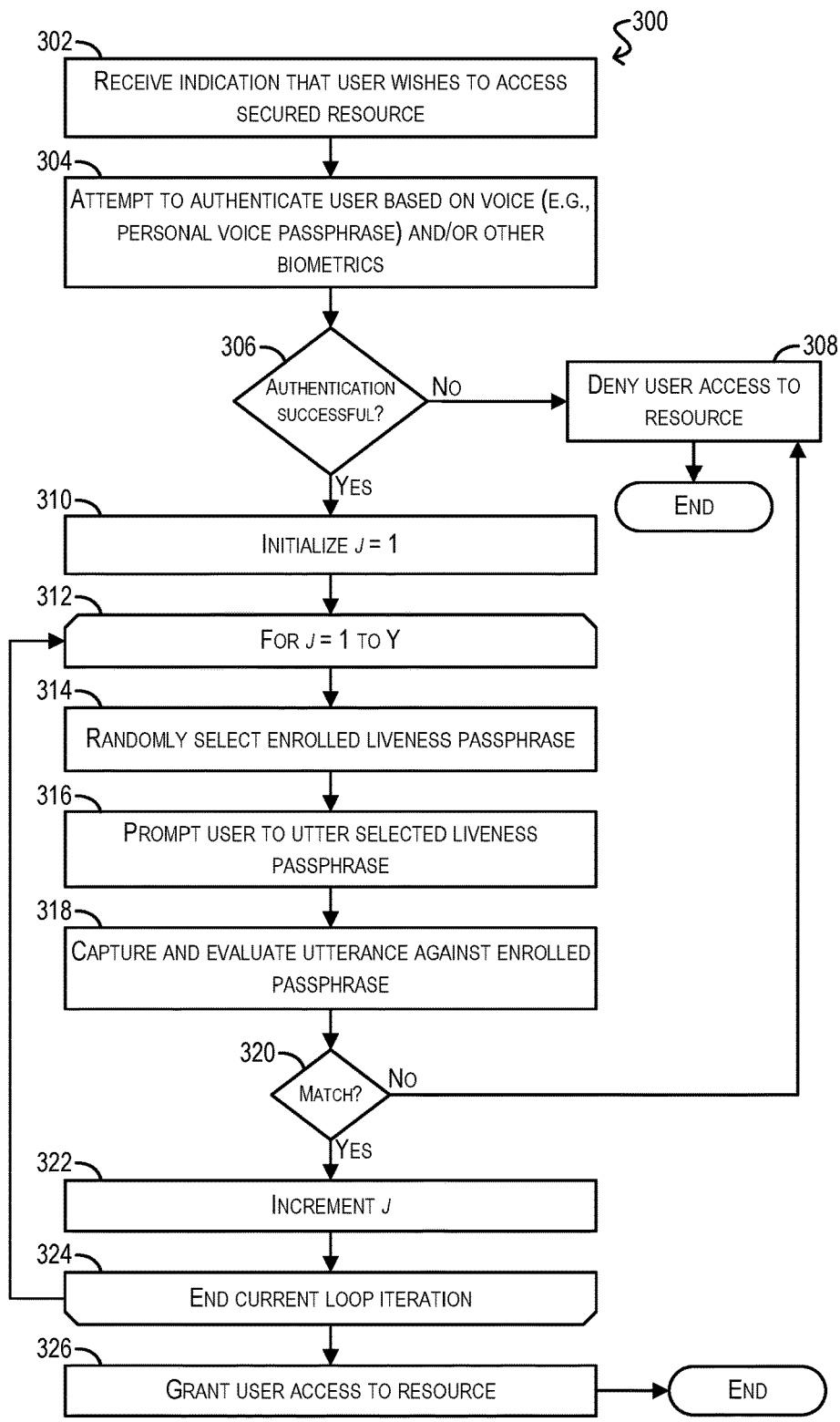
FIG. 3 depicts a user authentication workflow for implementing voice-based liveness verification according to an embodiment.

FIGS. 2 and 3 depict example workflows that can be performed by computing device 104 of FIG. 1 for implementing voice-based liveness verification according to an embodiment. In particular, FIG. 2 depicts a user enrollment workflow 200 and FIG. 3 depicts a user authentication workflow 300.

Starting with block 202 of FIG. 2, computing device 104 can prompt a user (e.g., user 102) to utter a passphrase of his/her choosing (referred to herein as a "personal passphrase"), thereby enrolling the user's voice with voice authentication module 106. In certain embodiments, computing device 104 may ask user 102 to repeat this personal passphrase N number of times (where N is configurable) in order to ensure that the personal passphrase is accurately heard. At block 204, computing device 104 can capture the user's utterance(s) via microphone 108 and can store a representation of the personal passphrase utterance(s) in a local or remote storage location.

Once the personal passphrase has been captured and stored, computing device 104 initializes a variable i to 1 and can enter a loop for i=1 to X, where X corresponds to a total number of liveness passphrases that should be enrolled for user 102 (blocks 206 and 208). As mentioned previously, "liveness passphrases" are passphrases that are specifically designed to verify the liveness of the user at the point of authentication. Within the loop, computing device 104 can randomly select a particular liveness passphrase from a predefined domain space of liveness passphrases (block 210) and can present a prompt that asks the user to utter the selected liveness passphrase (block 212). For instance, in one embodiment, the predefined domain space can correspond to the set of all possible two-digit numbers. In this case, the computing device 104 may prompt user 102 to utter a randomly selected two-digit number (e.g., 27). In other embodiments, the predefined domain space can correspond to any other set of elements (e.g., numbers, objects, etc.) that can be spoken by user 102.

It should be noted that the particular manner in which computing device 104 presents the prompt to the user at block 212 may vary; for example, computing device 104 may visually present the selected liveness passphrase on a display of the device. Alternatively, computing device 104 may generate an audible prompt. Further, like the personal passphrase, computing device 104 may ask user 102 to repeat the liveness passphrase N number of times (where N is configurable) in order to ensure that the liveness passphrase is accurately heard.

At block 214, computing device 104 can capture the user's utterance(s) of the selected liveness passphrase via microphone 108 and can store a representation of the utterance(s) to a local or remote storage location. Computing device 104 can then increment the value of i (block 216), reach the end of the current loop iteration (block 218), and return to the top of loop 206 if i has not yet reached X. Merely by way of example, if X is set to 10, computing device 104 can perform a second loop iteration in which device 104 prompts user 102 to utter the randomly selected two-digit number 84 and capture/store the user's utterance of "eight-four," a third loop iteration in which device 104 prompts user 102 to utter the randomly selected two-digit number 67 and capture/store the user's utterance of "sixty-seven," and so on. Once a total of X liveness passphrases have been enrolled by the user, enrollment workflow 200 can end.

Turning now to authentication workflow 300 of FIG. 3, at block 302, computing device 104 can receive an indication that a user (e.g., the same user 102 or a different user) wishes to access a secured resource on computing device 104. For example, the user may wish to unlock computing device 104 so that he/she can interact with it, or the user may wish to access a particular secured application or file on device 104.

In response, computing device 104 can attempt to authenticate the user based on his/her voice (via voice authentication module 106 and microphone 108) and/or based on other biometrics, such as the user's face, fingerprint, etc. (via other authentication modules 110 and other sensors 112) (block 304). For example, as part of block 304, computing device 104 can prompt the user to utter his/her personal passphrase and can capture the utterance via microphone 108. Voice authentication module 106 can then evaluate (using, e.g., conventional speech recognition techniques) the captured utterance against the enrolled personal passphrase stored at block 204 of FIG. 2, and thereby determine whether the acoustic features of the captured utterance are close enough to the enrolled personal passphrase to indicate that the user is enrolled user 102. As another example, computing device 104 can capture one or more images of the user's face via a camera of device 104. A face authentication module 110 of device 104 can then evaluate (using, e.g., conventional face recognition techniques) the captured images against a set of enrolled facial templates and thereby determine whether the facial features in the images are close enough to a particular template to indicate that the user is enrolled user 102.

If authentication modules 106/110 of computing device 104 determine that the user cannot be successfully authenticated based on his/her voice and/or other biometrics (block 306), device 104 can deny the user access to the secured resource (block 308) and authentication workflow 300 can end.

However, if authentication modules 106/110 determine that the user can be successfully authenticated as enrolled user 102 based on his/her voice and/or other biometrics, computing device 104 can proceed to carry out a voice-based liveness verification challenge using liveness verification module 114 per the remaining blocks of FIG. 3.

In particular, at blocks 310 and 312, liveness verification module 114 can initialize a variable j to 1 and can enter a loop for j=1 to Y, where Y is less than X (i.e., the total number of liveness passphrases enrolled by user 102 in FIG. 2). Within this loop, liveness verification module 114 can randomly select one of the enrolled liveness passphrases (block 314). Liveness verification module 114 can then present a prompt to the user to say the selected liveness passphrase (block 316), and can capture and evaluate the utterance against the stored representation of the enrolled passphrase (block 318).

If the captured utterance is not sufficiently close to (i.e., does not match) the enrolled version of the liveness passphrase (block 320), module 114 can conclude that the user is not a live subject, deny the user access to the secured resource (block 308), and terminate the authentication process.

On the other hand, if the captured utterance does match the enrolled version of the liveness passphrase, liveness verification module 114 can increment the value of j (block 322), reach the end of the current loop iteration (block 324), and can return to the top of loop 312 if j has not yet reached Y. In this manner, liveness verification module 114 can prompt the user to utter additional liveness passphrases (randomly selected from the enrolled set) until a total of Y passphrases are uttered and evaluated. If all of the uttered passphrases match their enrolled counterparts, liveness verification module 114 can conclude that the user is a live subject, grant the user access to the secured resource (block 326), and terminate the authentication workflow.

It should be appreciated that FIGS. 2 and 3 are illustrative and various modifications are possible. For example, in certain embodiments, the step of authenticating the user via his/her personal passphrase in FIG. 3 may be omitted, since speaker verification is inherently performed via the evaluation of the liveness passphrases. However, there are still benefits to authenticating the user via the personal passphrase; for instance, the personal passphrase may be longer than any of the liveness passphrases (which provides greater security), and the personal passphrase will typically be unknown to attackers. Thus, the verification of the personal passphrase provides significantly more security against a casual imposter attack in which the attacker simply tries to use his/her voice to impersonate an enrolled user.

Further, the values for X (i.e., the total number of enrolled liveness passphrases per user) and Y (i.e., the number of liveness passphrases prompted at the time of authentication) can be scaled as needed to adjust the desired level of security for the authentication process. Generally speaking, higher values for X and Y will result in greater security, with the tradeoff being that the enrollment and/or authentication processes will typically take longer to complete. In a particular embodiment, X may be set to 10 and Y may be set to 3.

Yet further, although the foregoing description mentions the set of all possible two-digit numbers as an example domain space for the liveness passphrase set, any other domain space may be used. For example, in one embodiment, the domain space may comprise the set of all possible three-digit numbers, four-digit numbers, or more for enhanced security. In another embodiment, the domain space may comprise any arbitrary collection of elements rather than numbers (e.g., fruit names such as "banana," "apple," "orange," and so on).

One advantage of using numbers is that they are nearly universal symbols (recognized by speakers of many languages) and each number can be said in any language (e.g., "vingt-sept" in French rather than "twenty-seven"). This makes the liveness verification process language-independent from a display standpoint (i.e., in terms of displaying the liveness passphrase prompts to a user), which makes it easier to implement across a wide variety of locales and languages. However, even if the domain space is not comprised of numbers, it still may be possible to keep the liveness verification process language-independent if a set of nonlinguistic and unambiguous symbols are used for prompting the user (e.g., photos of objects or emojis). Further, having the user choose the challenge prompts can have certain benefits. For instance, if a user is allowed to select his/her own challenge prompts, the user can be reassured that the authentication system is authentic when the user sees the prompts that he/she selected.

One difficulty with the liveness verification approach shown in FIGS. 2 and 3 is that the time to complete the enrollment process can be quite lengthy, even for relatively small (and thus, relatively insecure) values of X. For example, if X=10, user 102 would need to utter 10 different liveness passphrases during the enrollment process (and potentially repeat each passphrase N times for high accuracy). At the same time, an attacker would only need to capture 10 additional passphrases for a successful replay attack (or potentially less than 10, assuming Y is less than X and the attacker is prompted for the particular passphrases which he/she has recordings of).

Figure 4:
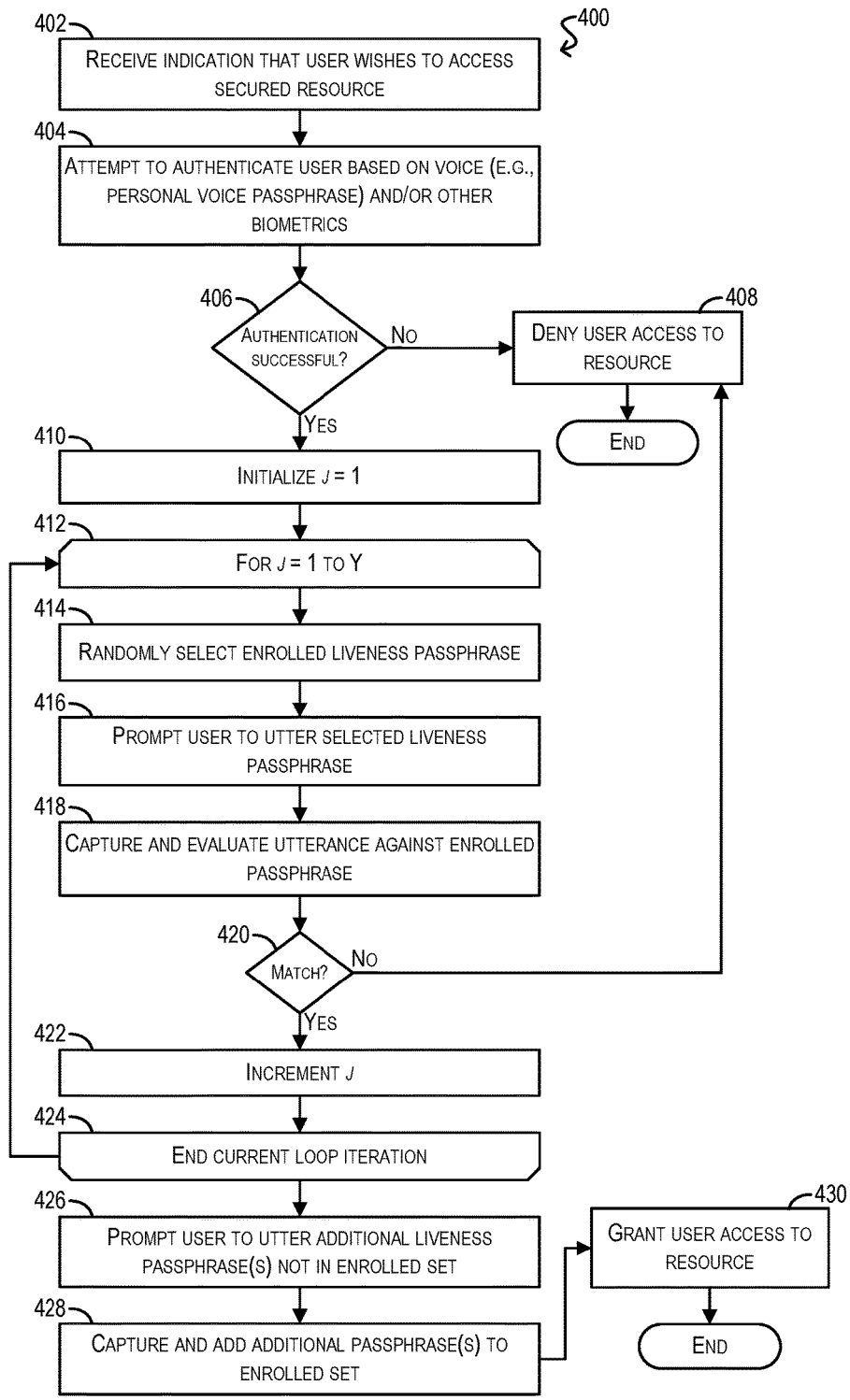
FIG. 4 depicts an alternative user authentication workflow according to an embodiment.

To address this, FIG. 4 depicts an example authentication workflow 400 that enables the enrolled set of liveness verification phrases for a given user (e.g., user 102) to be dynamically augmented at each successful authentication event. With workflow 400 (which serves as a replacement for the authentication workflow 300 of FIG. 3), the number of liveness passphrases that are enrolled during the enrollment process can be kept relatively low to facilitate speedy enrollment, without sacrificing the security of the liveness verification performed by liveness verification module 114.

Blocks 402-424 of workflow 400 are substantially similar to blocks 302-324 of workflow 300. At block 426 (i.e., after prompting and verifying Y liveness passphrases from the enrolled set), liveness verification module 114 can prompt the user to utter one or more additional liveness passphrases that are selected from the liveness passphrase domain space, but are not included in the enrolled set. For example, if the enrolled set includes the two-digit numbers 27, 84, 67, and 92, liveness verification module 114 may prompt the user to utter 53 ("fifty-three"). Liveness verification module 114 can then capture the user's utterance of this new liveness passphrase, add it to the enrolled set for the user (block 428), and allow the user access to the secure resource (block 430).

With the enhanced authentication workflow of FIG. 4, liveness verification module 114 can effectively increase the size of the user's enrolled liveness passphrase set with new data each time the user is successfully authenticated, and the newly added data can be used for future liveness verification prompts on subsequent authentication attempts. As a result, the enrolled set can grow to a large, or even unlimited size, without any explicit enrollment input from the user.

The enhanced authentication workflow of FIG. 4 also means that the enrollment workflow of FIG. 2 can be made significantly shorter, since the enrolled set will naturally grow over time. In a particular embodiment, enrollment workflow 200 may be modified such that the user is only prompted for his/her personal passphrase, and not for any liveness passphrases. In this case, there will be no liveness challenge for the first few authentication attempts, but the enrolled liveness passphrase set will grow and quickly become usable.

4. Example Computing Device

Figure 5:
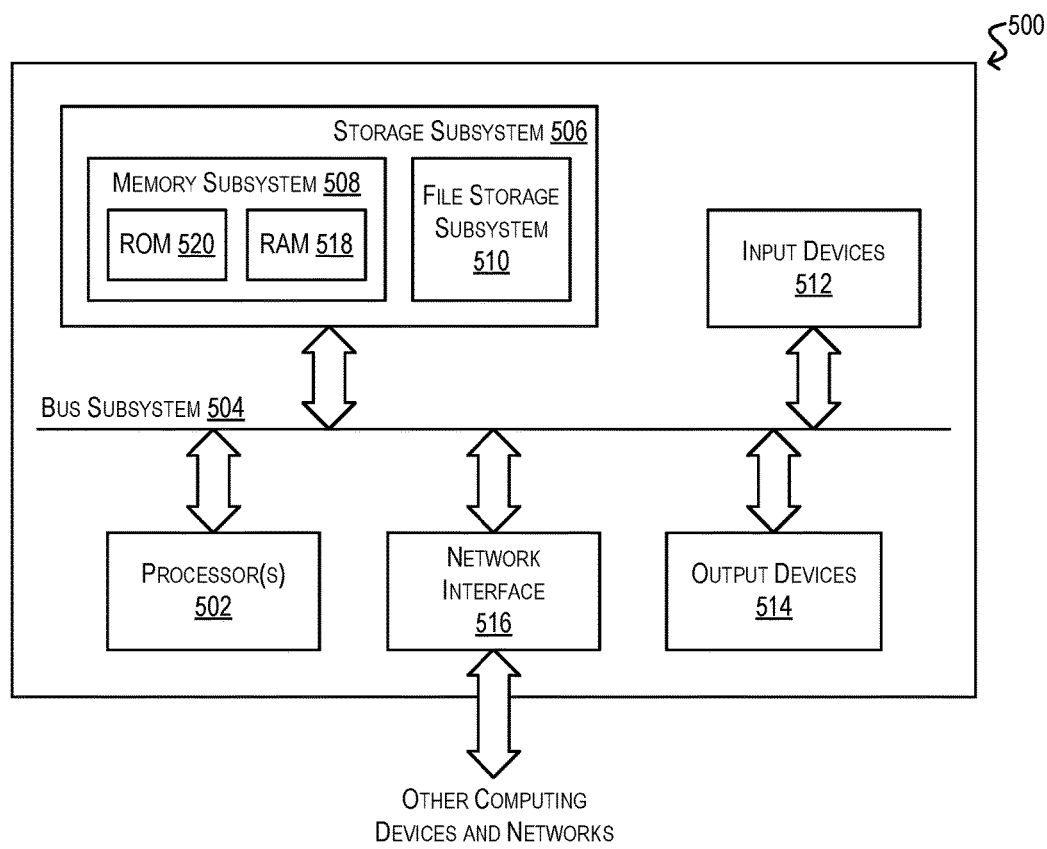
FIG. 5 depicts a computing device according to an embodiment.

FIG. 5 is a simplified block diagram of an example computing device 500 that may be used to implement the foregoing embodiments of the present disclosure. As shown, computing device 500 includes one or more processors 502 that communicate with a number of peripheral devices via a bus subsystem 504. These peripheral devices include a storage subsystem 506 (comprising a memory subsystem 508 and a file storage subsystem 510), input devices 512, output devices 514, and a network interface subsystem 516.

Bus subsystem 504 can provide a mechanism for letting the various components and subsystems of computing device 500 communicate with each other as intended. Although bus subsystem 504 is shown schematically as a single bus, alternative embodiments of the bus subsystem can utilize multiple buses.

Network interface subsystem 516 can serve as an interface for communicating data between computing device 500 and other computing devices or networks. Embodiments of network interface subsystem 516 can include wired (e.g., coaxial, twisted pair, or fiber optic Ethernet) and/or wireless (e.g., Wi-Fi, cellular, Bluetooth, etc.) interfaces.

Input devices 512 can include a camera (such as camera 108 of FIG. 1), a touch-screen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing device 500.

Output devices 514 can include a display subsystem (e.g., a flat-panel display), an audio output device (e.g., a speaker), and/or the like. In general, use of the term "output device" is intended to include all possible types of devices and mechanisms for outputting information from computing device 500.

Storage subsystem 506 includes a memory subsystem 508 and a file/disk storage subsystem 510. Subsystems 508 and 510 represent non-transitory computer-readable storage media that can store program code and/or data that provide the functionality of various embodiments described herein.

Memory subsystem 508 can include a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device 500 is illustrative and not intended to limit embodiments of the present invention. Many other configurations having more or fewer components than computing device 500 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
 receiving, by a computing device from a user, an indication that the user wishes to access a secured resource;
 attempting to authenticate, by the computing device via a voice-based authentication system, the user based on a personal voice passphrase uttered by the user; and
 if the attempting to authenticate is successful:
  presenting, by the computing device to the user, a series of challenge prompts, each challenge prompt corresponding to a request to utter a liveness passphrase that is randomly selected from a set of liveness passphrases that have been previously enrolled by an enrolled user of the computing device, the set of liveness passphrases being different from the personal voice passphrase;

receiving, by the computing device, utterances from the user in response to the series of challenge prompts; and if each utterance matches its corresponding enrolled liveness passphrase:

presenting the user with one or more additional challenge prompts that correspond to requests to utter liveness passphrases that have not yet been enrolled;

receiving one or more additional utterances from the user in response to the one or more additional challenge prompts;

adding the one or more additional utterances to the set of enrolled liveness passphrases; and responsive to the adding, granting, by the computing device, the user access to the secured resource.

2. The method of claim 1 further comprising:

if any utterance does not match its corresponding enrolled liveness passphrase, concluding that the user is not a live subject and denying the user access to the secured resource.

3. The method of claim 1 wherein presenting the series of challenge prompts comprising displaying an indication of each challenge prompt on a display of the computing device.

4. The method of claim 1 wherein the number of challenge prompts presented to the user is less than the total size of the set of enrolled liveness passphrases.

5. The method of claim 1 wherein the set of enrolled liveness passphrases are selected from a domain space of two-digit numbers.

6. The method of claim 1 wherein the set of enrolled liveness passphrases are selected from a domain space that is user-configurable.

7. A non-transitory computer readable medium having stored thereon program code executable by a processor of a computing device, the program code comprising:

code that causes the processor to receive, from a user, an indication that the user wishes to access a secured resource;

code that causes the processor to attempt to authenticate, via voice-based authentication, the user based on a personal voice passphrase uttered by the user; and if the attempting to authenticate is successful:

code that causes the processor to present, to the user a series of challenge prompts, each challenge prompt corresponding to a request to utter a liveness passphrase that is randomly selected from a set of liveness passphrases that have been previously enrolled by an enrolled user of the computing device, the set of liveness passphrases being different from the personal voice passphrase;

code that causes the processor to receive utterances from the user in response to the series of challenge prompts; and if each utterance matches its corresponding enrolled liveness passphrase:

code that causes the processor to present the user with one or more additional challenge prompts that correspond to requests to utter liveness passphrases that have not yet been enrolled;

code that causes the processor to receive one or more additional utterances from the user in response to the one or more additional challenge prompts;

code that causes the processor to add the one or more additional utterances to the set of enrolled liveness passphrases; and responsive to the adding, code that causes the processor to grant the user access to the secured resource.

8. The non-transitory computer readable medium of claim 7 wherein the program code further comprises:

if any utterance does not match its corresponding enrolled liveness passphrase, code that causes the processor to conclude that the user is not a live subject and deny the user access to the secured resource.

9. The non-transitory computer readable medium of claim 7 wherein presenting the series of challenge prompts comprising displaying an indication of each challenge prompt on a display of the computing device.

10. The non-transitory computer readable medium of claim 7 wherein the number of challenge prompts presented to the user is less than the total size of the set of enrolled liveness passphrases.

11. The non-transitory computer readable medium of claim 7 wherein the set of enrolled liveness passphrases are selected from a domain space of two-digit numbers.

12. The non-transitory computer readable medium of claim 7 wherein the set of enrolled liveness passphrases are selected from a domain space that is user-configurable.

13. A computing device comprising:

a processor; and a memory having stored thereon program code which, when executed by the processor, causes the processor to:

receive, from a user, an indication that the user wishes to access a secured resource;

attempt to authenticate, via a voice-based authentication system, the user based on a personal voice passphrase uttered by the user; and if the attempting to authenticate is successful:

present, to a user being authenticated by the computing device, a series of challenge prompts, each challenge prompt corresponding to a request to utter a liveness passphrase that is randomly selected from a set of liveness passphrases that have been previously enrolled by an enrolled user of the computing device, the set of liveness passphrases being different from the personal voice passphrase;

receive utterances from the user in response to the series of challenge prompts; and if each utterance matches its corresponding enrolled liveness passphrase:

present the user with one or more additional challenge prompts that correspond to requests to utter liveness passphrases that have not yet been enrolled;

receive one or more additional utterances from the user in response to the one or more additional challenge prompts;

add the one or more additional utterances to the set of enrolled liveness passphrases; and responsive to the adding, grant the user access to the secured resource.

14. The computing device of claim 13 wherein the program code further causes the processor to:

if any utterance does not match its corresponding enrolled liveness passphrase, conclude that the user is not a live subject and deny the user access to the secured resource.

15. The computing device of claim 13 wherein presenting the series of challenge prompts comprising displaying an indication of each challenge prompt on a display of the computing device.

16. The computing device of claim 13 wherein the number of challenge prompts presented to the user is less than the total size of the set of enrolled liveness passphrases.

17. The computing device of claim 13 wherein the set of enrolled liveness passphrases are selected from a domain space of two-digit numbers.

18. The computing device of claim 13 wherein the set of enrolled liveness passphrases are selected from a domain space that is user-configurable.

* * * * *